United States Patent [19]

Kovacs

[11] 4,391,081
[45] Jul. 5, 1983

[54] METHOD OF AND APPARATUS FOR FORMING, FILLING AND SEALING PACKAGES

[75] Inventor: Lloyd Kovacs, Sheboygan, Wis.

[73] Assignee: Hayssen Manufacturing Company, Sheboygan, Wis.

[21] Appl. No.: 185,209

[22] Filed: Sep. 8, 1980

[51] Int. Cl.³ .......................... B65B 1/24; B65B 9/06
[52] U.S. Cl. .................................. 53/436; 53/451; 53/526; 53/552
[58] Field of Search ............... 53/451, 551, 436, 526, 53/552, 554, 479, 373

[56] References Cited

U.S. PATENT DOCUMENTS

| | | | |
|---|---|---|---|
| 2,828,591 | 4/1958 | Bossche | 53/450 X |
| 2,915,866 | 12/1959 | Bartlo | 53/526 |
| 2,953,882 | 9/1960 | Tew | 53/552 X |
| 2,956,383 | 10/1960 | Gausman | 53/526 |
| 2,969,627 | 1/1961 | Leasure | 53/28 |
| 3,159,955 | 12/1964 | Thurlings | 53/551 |
| 3,262,244 | 7/1966 | Cutler | 53/551 |
| 3,449,888 | 6/1969 | Gausman | 53/182 |
| 3,528,214 | 9/1970 | Calvano | 53/551 X |
| 4,171,605 | 10/1979 | Putman | 53/552 |

Primary Examiner—John Sipos
Attorney, Agent, or Firm—Senniger, Powers, Leavitt and Roedel

[57] ABSTRACT

Method of and apparatus for forming, filling and sealing packages in which flexible packaging material is formed into tubing, the tubing is fed downwardly and transversely sealed at package length intervals by a pair of sealing members, a quantity of the product with which the packages are to be filled is delivered into the tubing during an interval of time between successive sealing operations, a contraction is formed in the tubing, after each delivery of product, above the level of the next seal to be made, the contraction is transmitted down on the tubing between the sealing members from above to below said level, thereby to compact the product, and the next seal is then made.

14 Claims, 18 Drawing Figures

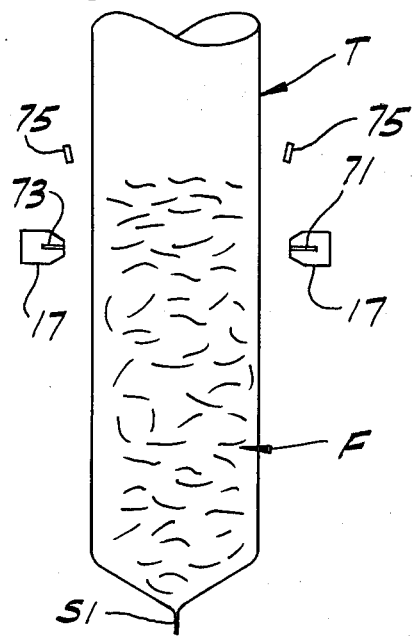
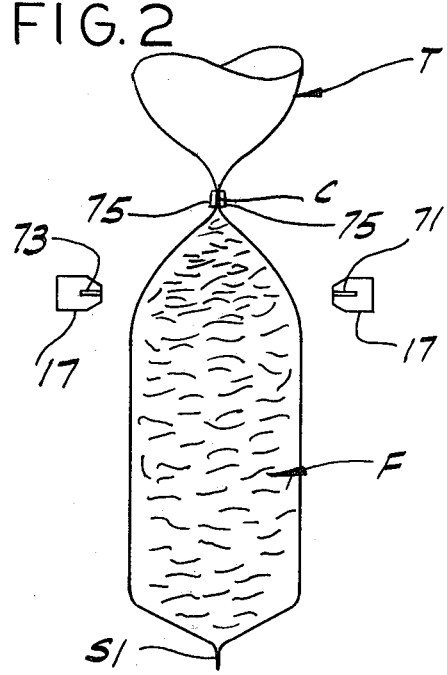
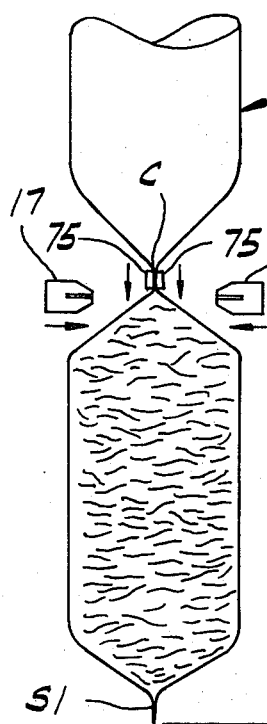
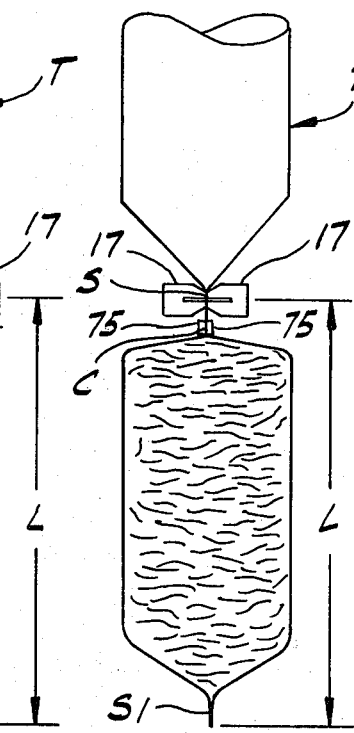
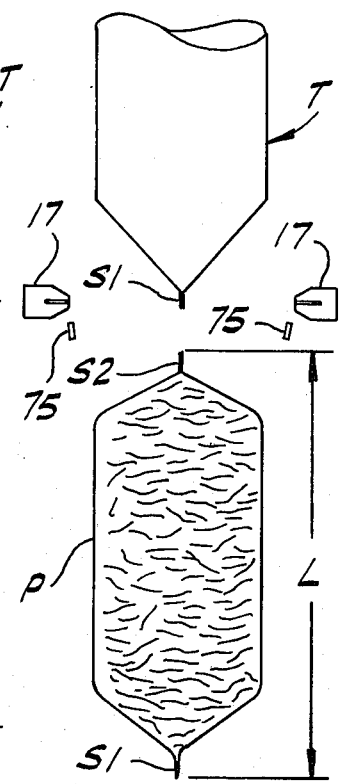

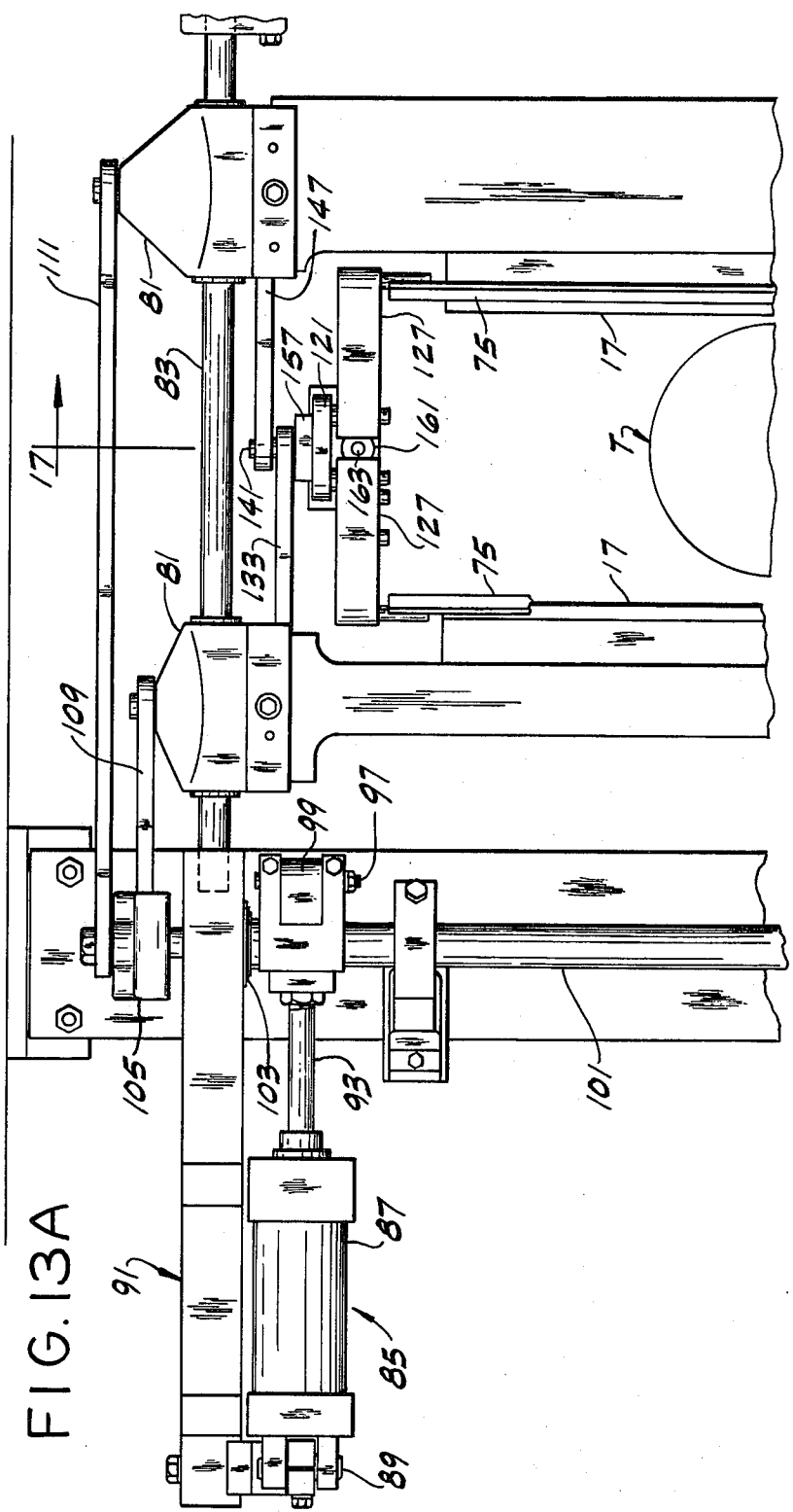

4,391,081

METHOD OF AND APPARATUS FOR FORMING, FILLING AND SEALING PACKAGES

BACKGROUND OF THE INVENTION

This invention relates to methods of and apparatus for forming, filling and sealing packages, and more particularly to vertical form-fill-seal packaging methods and apparatus.

The invention is especially directed to the type of package forming, filling and sealing in which flexible packaging material is formed into tubing, the tubing being fed downwardly and transversely sealed at package length intervals, a quantity of the product with which the packages are to be filled being delivered into the tubing during an interval of time between successive sealing operations, and is particularly concerned with problems encountered in the packaging of products such as potato chips or other snack foods comprising individual loose pieces which, as delivered into the tubing, may be too loosely packed and take up space greater than the volume of the pouch or bag to be formed, and which may extend up above the next seal to be made, thereby interfering with formation of the seal.

SUMMARY OF THE INVENTION

Among the several objects of the invention may be noted the provision of an improved method of and apparatus for forming, filling and sealing packages with the product compacted in the package and wherein, though product as delivered into the tubing from which the packages are formed may extend up above the region where the next seal is to be made, the product is effectively removed from said region prior to the formation of the seal; the provision of such a method and apparatus wherein the tubing is transversely sealed by sealing members operable in a fixed generally horizontal plane, the tubing being intermittently fed downwardly in package length increments during intervals of time when the sealing members are open; the provision of such a method and apparatus involving a stripping of the product down in the tubing between the sealing members; and the provision of such apparatus wherein the stripping is timed in relation to the operation of the sealing members in a simple yet effective manner.

In general, the method and apparatus of this invention are applied to the forming, filling and sealing of packages wherein flexible packaging material is formed into tubing, the tubing extending downwardly, the tubing is fed downwardly and transversely sealed at package length intervals by a pair of sealing members, and a quantity of the product with which the packages are to be filled is delivered into the tubing during an interval of time between successive sealing operations, being characterized in that after the delivery of the product into the tubing, and before the next seal is made, a contraction is formed in the tubing above the level of the next seal to be made, the contraction is transmitted down on the tubing between the sealing members from above to below said level, and the next seal is made.

Other objects and features will be in part apparant and in part pointed out hereinafter.

BRIEF DESCRIPTION OF THE DRAWINGS

FIGS. 1-5 are diagrammatic views illustrating the method of the invention and the sequence of operation of certain components (sealing jaws and stripper rods) of apparatus embodying the invention;

FIGS. 13A and 13B together constitute a plan, with parts broken away, of the sealing jaw and stripper rod actuating mechanism of the apparatus; showing the sealing jaws in their open position and the stripper rods in their open position;

Corresponding reference characters indicate corresponding parts throughout the several views of the drawings.

DESCRIPTION OF THE PREFERRED EMBODIMENT

Figure 6:
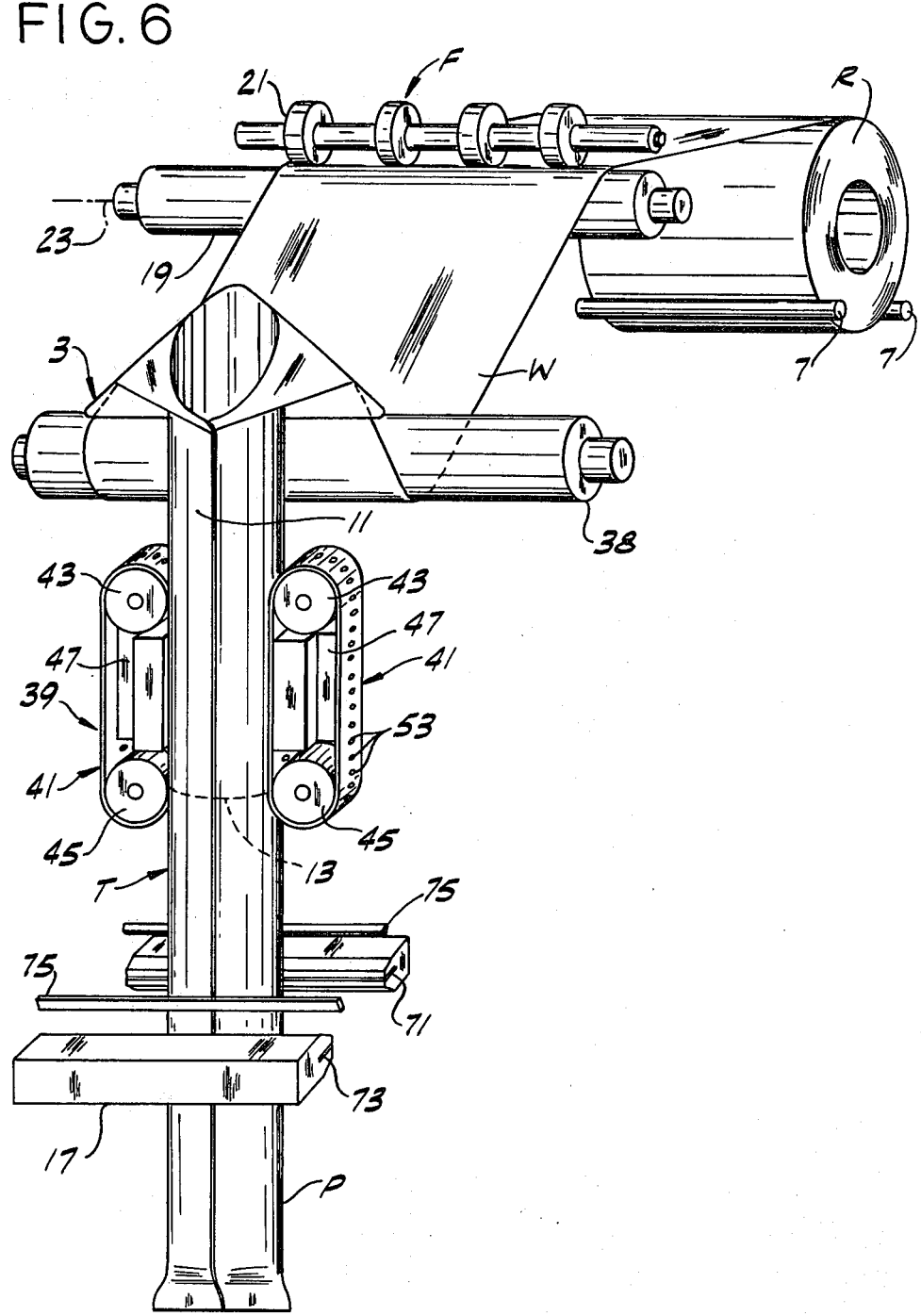
FIG. 6 is a perspective of a vertical form/fill/seal machine embodying the invention.

Referring first to FIGS. 1-5 of the drawings, the invention is shown as it relates to the forming, filling and sealing of packages involving the forming of flexible packaging material, for example a single web of flexible packaging material, into tubing designated T, with the tubing extending downwardly, the tubing being intermittently fed downwardly and transversely sealed at package length intervals L, a quantity of the product with which the packages are to be filled being delivered into the tubing during the interval between successive sealing operations. As herein illustrated, the forming, feeding and sealing of the tubing may be carried out by means of vertical form-fill-seal apparatus such as shown in the copending coassigned U.S. patent application of Robert C. James, Ser. No. 069,828, filed Aug. 27, 1979, issued as U.S. Pat. No. 4,288,965, Sept. 15, 1981, involving a pair of sealing members, more particularly a pair of sealing jaws, intermittently movable in and out in a fixed horizontal plane between an open position and a closed position in sealing engagement with the tubing for forming a transverse seal S across the tubing. However, it is to be understood that, broadly considered, these operations may be carried out by means of other types of vertical form-fill-seal apparatus including, for example, apparatus of the type in which the sealing jaws are movable up and down, closing on the tubing at the top of their stroke and pulling down a package length increment of the tubing, the sealing jaws then opening and moving up to the top of their stroke, so as to provide a package length increment of the tubing extending down from the sealing jaws at the top of their stroke.

The method of the invention is characterized in that after the delivery of the product into the tubing T and before the next transverse seal is made a contraction is formed in the tubing as indicated at C above the level of the next transverse seal S to be made, the contraction C being transmitted down on the tubing between the sealing members from above to below said level, and then the next seal S is made above the contraction. The contraction and its transmission down on the tubing resembles peristalsis, resulting in compaction of the product in the tubing below the level of the next seal to be made. Also, as the contraction travels down between the sealing members, it squeezes down in the tubing any product which may have been in the tubing above the level of the next seal to be made into the interior of the tubing below said level, thereby avoiding the presence of product in the tubing where the seal is made.

FIGS. 1–5 illustrate the method as it relates to the type of operation in which the sealing jaws, which are designated 17, operate in a fixed generally horizontal plane, being movable relative to one another toward and away from one another between an open position (FIGS. 1 and 2) spaced apart a distance somewhat greater than the diameter of the tubing T and a closed position (FIG. 4) in sealing engagement with the tubing for forming the transverse seal S. Typically, although not essentially, one of the sealing jaws carries a knife 71 adapted to be driven into a slot 73 in the other jaw when the jaws have closed (conventionally by means of an air cylinder) for transversely cutting the tubing through the seal S, forming the trailing or upper end seal S2 for the package being completed and the leading or lower end seal S1 for the next package to be formed. The contraction is effective by means of a pair of so-called stripper members or rods each designated 75 movable relative to one another toward and away from one another from an open position (FIG. 1) spaced a distance greater than the tubing diameter but less than the spacing of the opened sealing jaws to a closed position (FIG. 2) in engagement with and squeezing the tubing. These stripper rods are also movable up and down between a lowered position (FIG. 4) below the plane of the sealing jaws 17 and a raised position (FIGS. 1 and 2) above this plane.

FIG. 1 shows the initial phase of the forming, filling and sealing cycle of a package. Here the sealing jaws 17 are open. The tubing T extends down between the jaws 17 one package length increment, having an end seal S1 at its lower (leading) end. The stripper rods 75 are in their raised position and open (extending on opposite sides of the tubing above the horizontal plane of and parallel to the jaws 17). A measured quantity of the product with which the package is to be filled (e.g., potato chips) is delivered into the tubing from above (as is conventional in vertical form/fill/seal operations). The stated quantity of the product, which may be referred to as the "package fill" and which is indicated at F is uncompacted in the lower end portion of the tube. Some of the fill may extend up above the plane of the jaws 17, as shown in FIG. 1. Generally, none of it will be above the horizontal plane of the stripper rods.

After the delivery of the product into the lower end portion of the tubing and before the next seal is made by the sealing jaws 17, the stripper rods 75 are moved inwardly toward one another from their open position of FIG. 1 to their closed position of FIG. 2 in engagement with and squeezing the tubing and thereby forming contraction C in the tubing. This occurs with the stripper rods 75 in their raised position, the contraction C thereby being formed above the horizontal plane of the sealing jaws 17 and thus being formed above the level of the next seal to be made.

As the sealing jaws 17 move (see FIG. 3) from their open to their closed position, the stripper rods 75 (in their closed position and forming contraction C in the tubing) are moved down on the tubing thereby transmitting the contraction down on the tubing from above the level of the jaws (i.e. the level of the next seal to be made) to below said level (see FIG. 4). The stripper rods move down between the jaws 17 before the latter are completely closed and act to compact the product and squeeze down any product which may have been in the tubing above the level of the jaws down below this level.

As the stripper rods 75 complete their downward movement and reach their lowered position below the level of the sealing jaws 17, the latter complete their movement to their closed position of FIG. 4 in sealing engagement with the tubing, above the stripper rods. This forms seal S comprising the top (trailing) seal S2 for the package being completed, and the bottom (leading) seal S1 for the next package to be formed. With the sealing jaws 17 closed, the knife 71 is actuated to cut through the tubing between the seals S2 and S1 to sever the completed package from the tubing.

The sealing jaws 17 and the stripper rods 75 then open (FIG. 5) allowing the completed package P to drop out, the stripper rods are returned to their raised and open position of FIG. 1, and another package length increment L of the tubing is fed down between the stripper rods and between the sealing jaws for the next cycle of operation.

Now referring to FIGS. 6–12, the invention is shown as incorporated in a vertical form-fill-seal apparatus such as shown in the aforesaid coassigned copending U.S. patent application Ser. No. 069,828 wherein a web W of flexible packaging material is pulled from a supply, fed over means 3 for forming the web into the tubing T, product to be packaged is provided in the tubing, and sealing operations are performed on the tubing as generally indicated at 5 to seal it to form packages. The packaging material may be low density polyethylene film, for example, and the supply may be constituted by a roll R of the film suitably supported as indicated at 7. The forming means 3 may be a forming shoulder generally of a conventional type such as shown, for example, in the coassigned U.S. Pat. Nos. 3,050,916 issued Aug. 28, 1962, 3,449,888 June 17, 1969, and 3,664,086 issued May 23, 1972.

Figure 7:
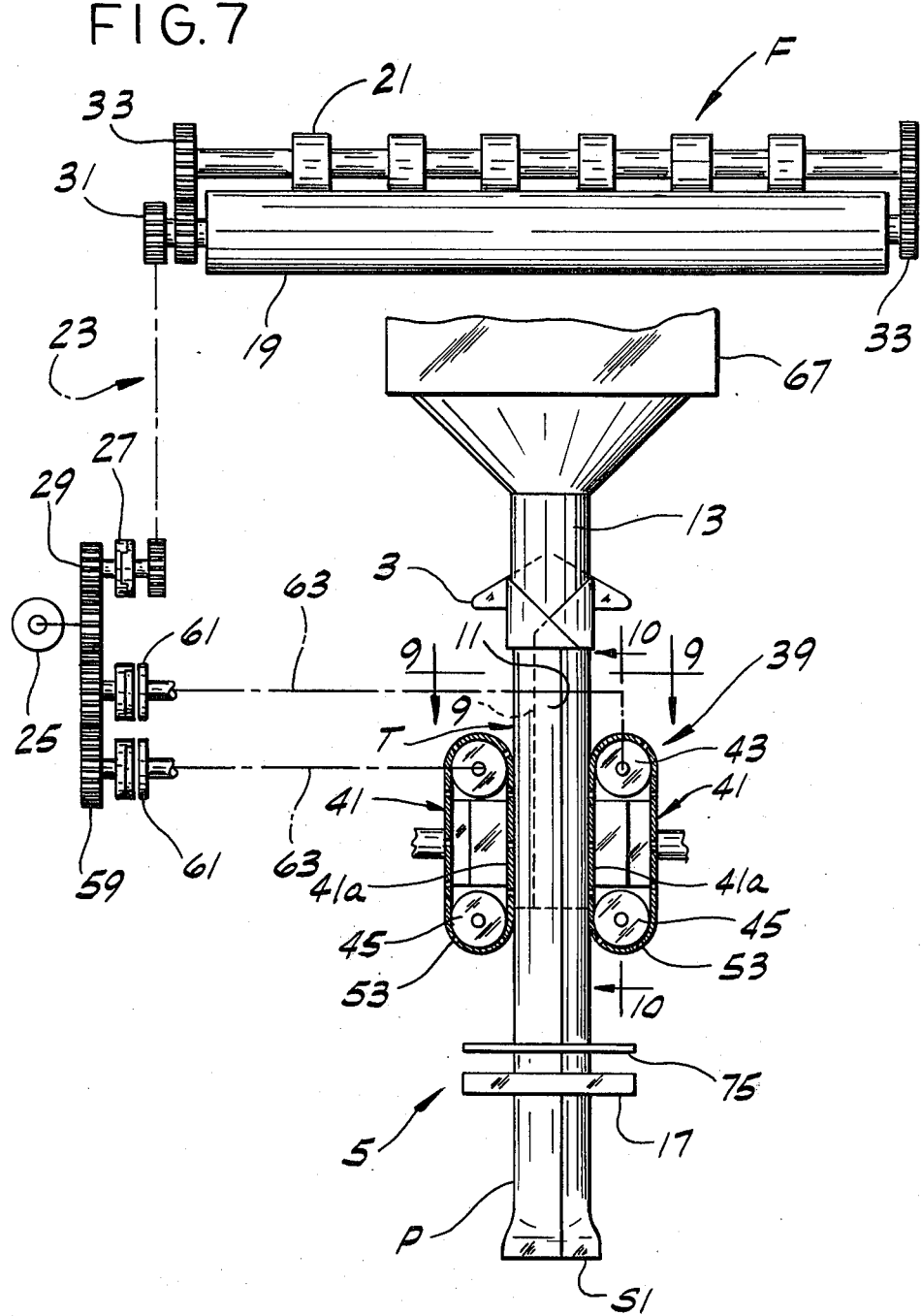
FIG. 7 is a front elevation of FIG. 6, showing certain drive mechanism of the machine.
Figure 8:
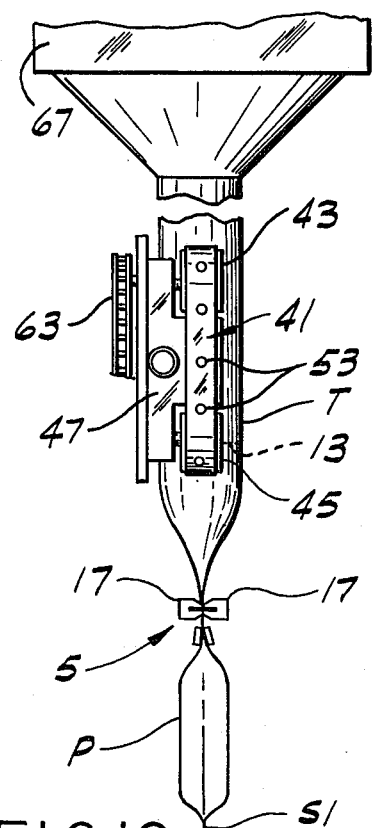
FIG. 8 is a side elevation of the lower part of FIG. 7.
Figure 9:
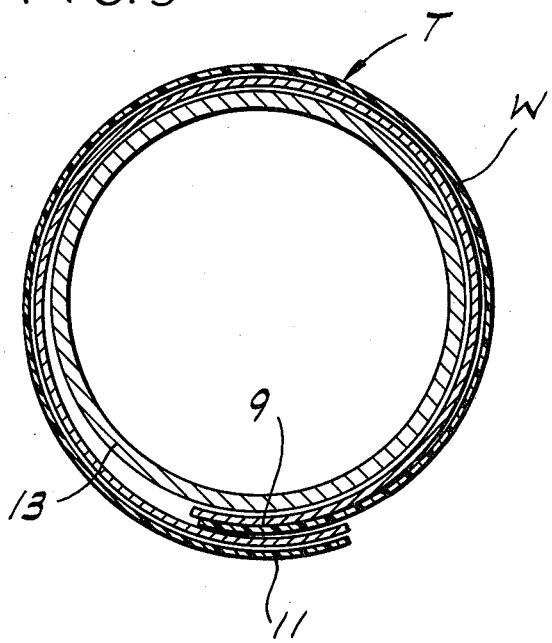
FIG. 9 is an enlarged horizontal section generally on line 9—9 of FIG. 7.
Figure 10:
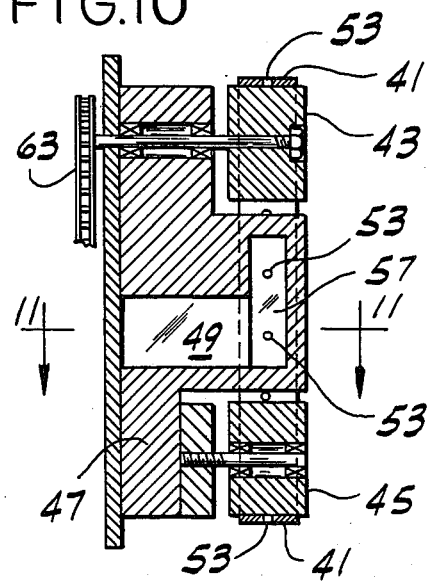
FIG. 10 is an enlarged vertical section generally on line 10—10 of FIG. 7.
Figure 11:
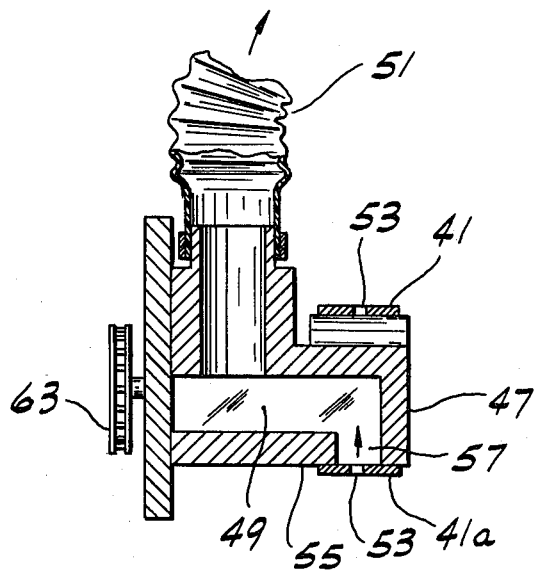
FIG. 11 is a section generally on line 11—11 of FIG. 10.

As shown in FIGS. 6, 7 and 9, the forming shoulder 3 forms the web W of packaging material into the tubing T with the longitudinal margins 9 and 11 of the Web W in lapping relationship, and directs the tubing downwardly around a vertically extending, hollow mandrel 13. As illustrated, margin 9 is on the inside, margin 11 on the outside. At 15 in FIG. 1 is diagrammatically indicated suitable means for sealing the lapping margins 9 and 11 of the web to form a longitudinal seam for the tubing. Product is provided in the tubing T via the hollow mandrel 13 in suitable conventional manner, and the tubing is transversely sealed at package length intervals by the sealing jaws or bars 17 at 5 below the lower end of the mandrel. The sealing jaws or bars 17 are operable in a fixed horizontal plane below the lower end of the mandrel to form the top seal S2 for the package being completed and the bottom seal S1 for the next package to be formed. One of the seal bars carries the knife 71 and the other has the groove 73 receiving the knife for cutting transversely between the seals made at 5 to separate the completed package P from the tubing. The tubing is intermittently fed downward one package length increment, the jaws 17 being open. The tubing dwells between successive feed cycles, the jaws 17 being closed on the tubing for the transverse sealing operation during each dwell.

The web W is intermittently pulled from supply roll R, measured for each sealing operation at 5, and fed forward toward the forming shoulder 3 by means indicated generally at F located between the supply roll and the forming shoulder. This means F is intermittently operable to feed the web forward one package length increment in a given interval, acting as a web feeding and measuring or metering means. As illustrated, it comprises a lower roll 19 and an upper roll 21 with means indicated generally at 23 for intermittently driving these rolls through a predetermined interval corresponding to the desired length for the packages to be formed to feed the web forward one such increment. As shown in FIG. 7, the driving means 23 comprises a continuously operating electric motor/speed reducer unit 25 driving the input of an electric clutch/brake unit 27 via gearing indicated at 29, the output of the clutch/brake unit being connected to the lower roll 19 as indicated at 31. The rolls 19 and 21 are geared together as indicated at 33. The clutch of unit 27 is adapted intermittently to be engaged and the brake of unit 27 disengaged for driving the rolls 19 and 21 to feed forward the requisite package length increment of web W on each feed cycle by a suitable programmable control 35 which is under the control of an encoder 37 (see FIG. 12), the clutch being disengaged and the brake engaged to terminate the feed cycle and remaining so for the dwell of the web W and tubing T, the clutch then being engaged and the brake disengaged for the next feed cycle.

The web W travels from the measuring and feeding rolls 19 and 21 under a guide roll 38 and thence up to and around forming shoulder 3. The increment of the web W fed forward by the measuring and feeding rolls 19 and 21 is taken up and pulled over the forming shoulder 3 under tension by tubing feeding means indicated generally at 39 in FIGS. 6 and 7 below (downstream from) the forming shoulder. This tubing feeding means 39 acts to pull the web over the forming shoulder 3 under tension to maintain the web taut. The tubing feeding means tends to draw the tubing down (forward) on the mandrel 13 a distance greater than the package length increment in the stated interval of operation of the rolls 19 and 21. The draw-down force on the tubing is relatively low. While means 39 tends to draw the tubing T down a greater distance than the package length increment, the tubing is drawn down only a distance corresponding to the package length increment (the tension is insufficient to stretch it to any substantial extent), and the package length increment of the web W metered out and fed forward by the rolls 19 and 21 is thereby taken up and pulled over the forming shoulder 3 under tension, with the tension substantially uniform for proper tracking of the material over the forming shoulder.

The tubing feeding means 39, as illustrated, comprises a pair of endless belts, and more particularly a pair of vacuum belts each designated 41 at opposite sides of the mandrel 13 (for vacuum gripping the tubing to feed it downward). Each belt is a flat belt trained around an upper pulley 43 and a lower pulley 45 and so arranged as to have a downwardly movable inner reach 41a engageable with the tubing T at the respective side of the mandrel 13. The two pulleys for each belt are mounted on a block 47 having a vacuum passage 49 therein (see FIGS. 10 and 11) in which a vacuum is drawn in suitable conventional manner via a vacuum hose 51. The belt has holes 53 spaced at suitable intervals throughout its length. The inner reach 41a of the belt travels in sealing engagement with the face 55 of the block 47 toward the mandrel 13, i.e., the inside of the block, in register with one end 57 constituting the inlet end of the vacuum passage 49 in the block. As the belt travels past inlet 57, vacuum is drawn through those holes 53 in the belt which are in communication with the inlet. The tubing on the mandrel 13 is thereby vacuum gripped to the inner reach 41a of the belt for being fed downward by the belt. Friction belts may be used in certain instances instead of vacuum belts.

The vacuum belts 41 are operated intermittently for feeding the tubing T downward on the mandrel 13 concurrently with each operation of the web feeding rolls 19 and 21. The belts may be started in operation generally at the same time or somewhat before the rolls 19 and 21 start feeding the web W. They are operated at such a rate relative to the rolls 19 and 21 as to tend to feed the tubing downward at a rate faster than that at which rolls 19 and 21 feed the web forward, and may be stopped generally at the same time or shortly after the rolls 19 and 21 stop. Means for operating the belts in this manner is shown to comprise a gear drive 59 from the electric motor/speed reducer unit 25 to the input of each of a pair of air-operated slip clutches each designated 61, with individual drive trains as indicated at 63 from the outputs of the slip clutches to the upper pulleys 43 for the two belts 41. The slip clutches 61 are under control of an air valve 65 (FIG. 12) which is in turn controlled by the programmable control 35. The latter functions to actuate (engage) the slip clutches 61 to start driving the belts either at the same time or somewhat before the electric clutch/brake unit 27 is actuated, and to maintain the slip clutches engaged for driving the belts until the electric clutch/brake unit 27 is deactuated or somewhat thereafter, the slip clutches then being deactuated to stop the belts. While engaged, the slip clutches permit slip in the drives from the unit 25 to the belts.

In the operation of the apparatus of FIGS. 6-12, the motor/speed reducer unit 25 is operated continuously. The clutch/brake unit 27 is actuated (i.e., its clutch is engaged, its brake disengaged) in timed relation to a function of the apparatus such as a filling function, the encoder 37 being operable to signal the programmable control 35 to actuate the unit 27 to start driving rolls 19 and 21 to unwind the web W from the supply roll R and feed it forward at the appropriate time, e.g., when a scale such as indicated diagrammatically at 67 in FIGS. 7 and 8 has weighed out the quantity of product to be delivered for a package, and has dumped the product for delivery down through the mandrel 13 into the tubing T. The unit 27 remains actuated for an interval such as to cause rotation of the rolls 19 and 21 to feed forward a package length increment of the web, and is then deactuated. The interval may be determined and controlled via the programmable controller 35 or by means of an optical scanning system operating in conjunction with registration marks at package length intervals on the web in the case of preprinted web, or by means measuring the rotation of the rolls 19 and 21 in the case of unprinted web, or in other suitable manner well known in the art.

The programmable control 35 operates to actuate the valve 65 for engaging the slip clutches 61 to start driving the belts 41 either at the same time or somewhat before the rolls 19 and 21 start feeding the web W forward toward the forming shoulder 3. Thus, when the rolls 19 and 21 operate to feed the web forward, the belts are in operation and act to draw down the tubing T formed as the web passes over the forming shoulder 3. The drive for the belts is such that they tend to travel at a rate greater than the rate at which rolls 19 and 21 feed the web forward. For example, they may tend to travel at a rate about 10% greater than the rate at which rolls 19 and 21 feed the web forward (that is, the blets if wholly free of any restraint would travel a distance 10% greater than the amount of web released (i.e., fed forward) by rolls 19 and 21. However, the tubing T cannot advance any faster than the rate at which rolls 19 and 21 feed the web forward without stretching (the web being caught in the nip of rolls 19 and 21) and the pull exerted by the belts on the tubing is relatively light and too low to cause any substantial stretching. Hence, the belts travel generally at a greater rate than the web and, in tending to travel faster than the web, exert a downward pull on the tubing T to tension it and thereby pull the material over the forming shoulder 3 under tension to maintain the web taut. The operation of the belts at a greater rate than the speed of the web feed is governed and controlled by slippage in the slip clutches 61, and by some slippage of the belts past the packaging material.

At the start of the downward feed of the tubing T, the sealing jaws or bars 17 are open, and remain open throughout the downward feed of the tubing off the lower end of the mandrel 13.

When the rolls 19 and 21 have measured out and fed forward one package length of web W, and the belts 41 have drawn the tubing T down one package length on the mandrel and fed one package length of the tubing T off the lower end of the mandrel, the clutch/brake unit 27 is deactuated to stop the rolls 19 and 21 and thereby stop the forward feed of the web, for the dwell of the web and the tubing for the sealing operation. The slip clutches 61 are deactuated either at the same time as the rolls 19 and 21 stop, or slightly thereafter. When deactuated, the slip clutches may be wholly disengaged so as to stop drives 63 to the belts 41, or they may remain lightly engaged to exert a light drive via 63 on the belts so that the belts exert a light draw-down force on the tubing to maintain tension in the tubing.

With the tubing T stopped, and with product in the tubing above the transverse seal S1 at the lower end of the tubing (this seal being one package length below the sealing jaws 17 and constituting the bottom seal for the package to be completed) the jaws are closed on the tubing to form the top seal for the package P being completed and the bottom seal S2 for the next package to be formed. The jaws then open, and rolls 19 and 21 and belts 41 are operated through the next feed cycle.

Figure 13B:
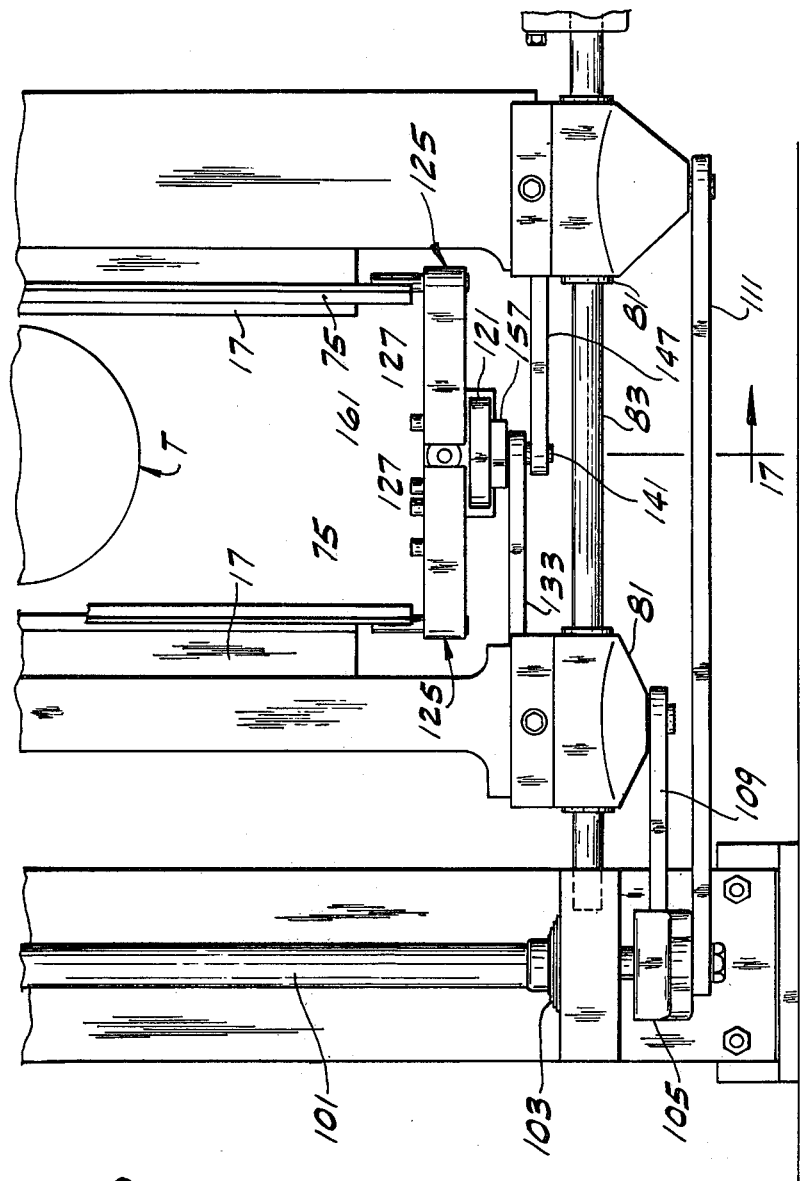
Figure 14:
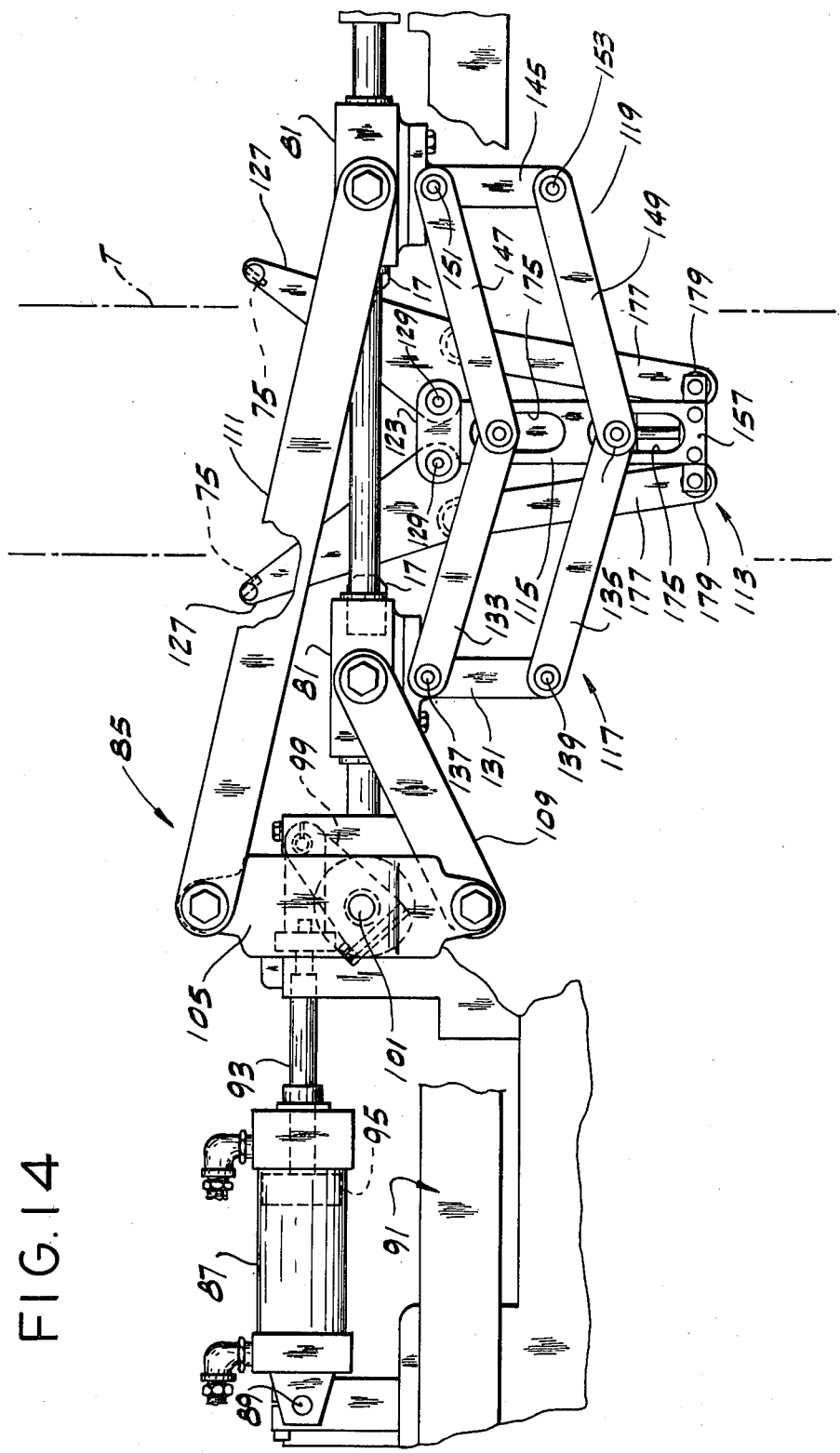
FIG. 14 is a side elevation of the FIG. 13 mechanism showing the sealing jaws open and the stripper rods in their raised and open position.
Figures 15, 16:
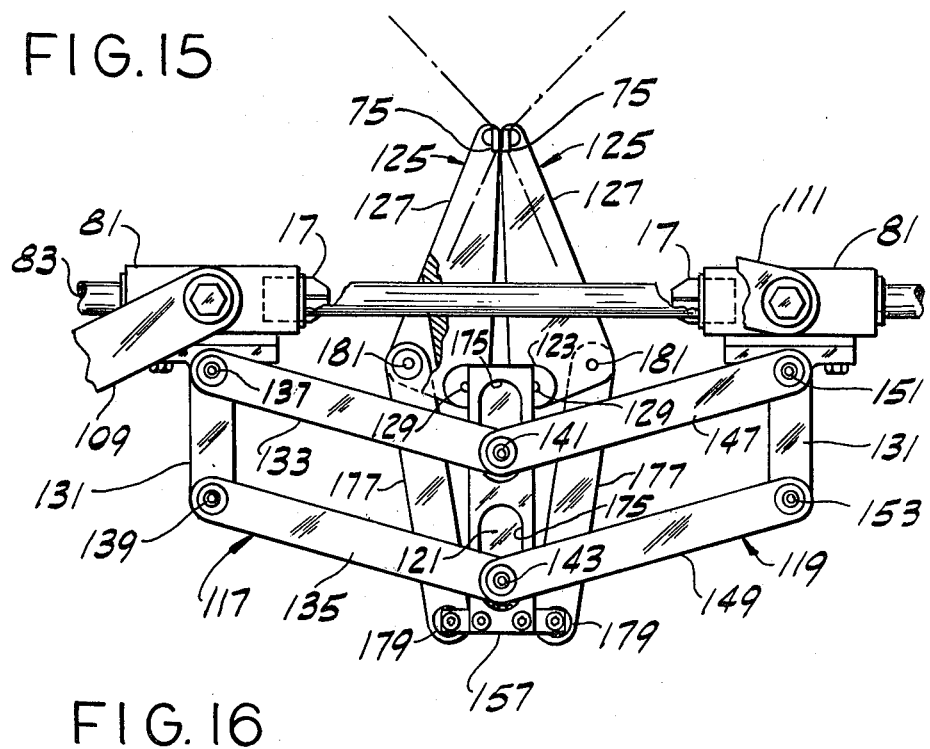
FIG. 15 is a view similar to FIG. 14 with parts omitted showing the sealing jaws open and the stripper rods closed on the tubing (corresponding to FIG. 2)
FIG. 16 is a view similar to FIG. 15 showing the sealing jaws closed and the stripper rods in their lowered and closed position (corresponding to FIG. 4)

As shown in FIGS. 13A and B and 14, each of the sealing jaws or bars 17 is mounted for movement transversely of its length in a horizontal plane by means of a pair of tubular slides 81 at its ends slidable on a pair of slide guide rods 83 extending horizontally parallel to one another at opposite sides of the apparatus. Means indicted generally at 85 is provided for sliding the sealing jaws back and forth on the rods toward and away from each other, this means being shown to comprise an air cylinder 87 pivoted as indicated at 89 at its tail end on a frame structure 91 of the apparatus, and having its piston rod 93 extending from its piston 95 through its head end to a pin connection at 97 with a crank 99 on a cross-shaft 101 journalled in bearings 103 in the frame structure. Shaft 101 has a double crank 105 at each of its ends, each crank 103 having its lower end connected to the slides 81 for one of the jaws 17 by links 109, and its upper end connected to the slides 81 for the other jaw 17 by links 111. The arrangement is such that on extension of the piston rod 93 from the cylinder 87, the sealing jaws 17 are moved away from each other (see FIGS. 13A and B and 14), and on retraction of the piston rod the jaws are moved toward each other (FIG. 16). The cylinder 87 may be vertically arranged and operable on the shaft 101 via a rack and pinion mechanism, instead of as shown.

As shown in FIGS. 13–16, the stripper rods 75 are carried by means indicated generally at 113 supported by the sealing jaw slides 81, this means 113 being operable to move the stripper rods down from their raised to their lowered position as the sealing jaws 17 close, and to move the stripper rods up from their lowered to their raised position as the sealing jaws open, also being operable to close the stripper rods for their downward movement for squeezing product down in the tubing T and to open the stripper rods upon their upward movement. This means comprises a pair of carrier members 115, one at each side of the apparatus, a first pair of parallelogram linkage means each generally designated 117, one at each side of the apparatus, interconnecting the slides 81 for one of the sealing jaws 17 and the carrier members 115, and a second pair of parallelogram linkage means each generally designated 119, one at each side of the apparatus, interconnecting the slides 81 for the other sealing jaw 17 and the carrier members 115. Each of the carrier members 115 comprises a vertically extending flat bar generally of T-shape and thereby having a stem 121 and a head 123 on the stem. Each stripper rod 75 is mounted on the carrier members by means of a pair of arms, each pair being generally designated 125 and each arm of the pair being designated 127, each arm of one of the pairs being pivoted as indicated at 129 at one end thereof constituting its lower end to the carrier members adjacent one end of the heads 123 of the carrier members, and each arm of the other pair being pivoted also as indicated at 129 at one end thereof constituting its lower end to the carrier members adjacent the other end of the heads 123 of the carrier members. The arms 127 carrying the stripper rods extend up from the carrier members, with each stripper rod 75 extending transversely of the apparatus between the two arms 127 of the respective pair of arms 125 at the upper ends of the arms. The arrangement is such that the pairs 125 of arms 127 are swingable toward and away from each other on the pivots at 129 to move the stripper rods 75 toward and away from one another between their open and closed positions. The arms 127 at one side of the apparatus are spaced from the arms 127 at the other side a distance less than the spacing of the guide rods 83, so that the arms 127 and the stripper rods 75 are movable up and down between the sealing jaws 17 on opening of the latter.

Each one of the first pair of parallelogram linkage means 117 and each one of the second pair of parallelogram linkage means 119 includes, as a common link thereof, a respective carrier member 115, i.e. the linkage means 117 and 119 of the first and second pairs at one side of the apparatus include as a common link thereof the carrier member 115 at that side, and the linkage means 117 and 119 of the first and second pairs at the other side of the apparatus includes as a common link thereof the carrier member at said other side of the apparatus. Each one of the first pair of parallelogram linkage means 117 further includes a bar 131 fixed to a respective slide 81 and extending vertically down from the slide, and an upper link 133 and a lower link 135 extending parallel to one another, pin-connected at 137 and 139 to the bar 131 and pin-commected at 141 and 143 to the respective carrier member 115, the latter constituting a vertically movable link of each parallelogram linkage means. Each one of the second pair of parallelogram linkage means 119 further includes a bar 145 (like 131) fixed to a respective slide 81 and extending vertically down from the slide, and an upper link 147 and lower link 149 extending parallel to one another, pin-connected at 151 and 153 to the bar 145 and pin-connected at 141 and 143 to the respective carrier member 115.

Figure 17:
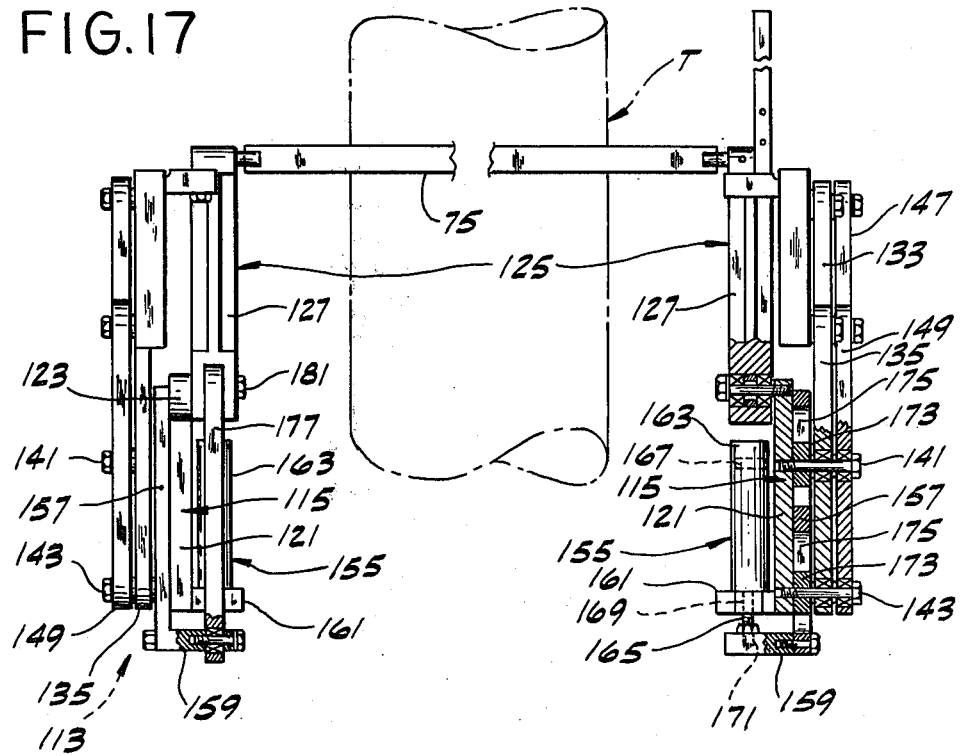
FIG. 17 is a vertical section generally on line 17—17 of FIGS. 13A, B.

Each carrier member or common link 115 of the parallelogram linkage means carries means indicated generally at 155 (see FIG. 17) for swinging the stripper rod arms 127 to move the stripper rods 75 between their open and closed positions. As to each carrier member or link 115, this means comprises a stripper rod actuator 157 mounted for vertical sliding movement on the outside face of member 115, having a foot 159 extending inwardly below an inwardly extending base 161 on carrier 115 at its lower end. An air cylinder 163 mounted on the base 161 of carrier 115 extends up on the inside of carrier 115 and has its piston rod 165 extending down from the piston 167 therein through a hole 169 in the base to a connection at 171 with the foot 159 of the actuator, the arrangement being such that on extension of rod 165 from the cylinder 163, the actuator 157 is driven down relative to the carrier member 115, and on retraction of the piston rod 165 the actuator 157 is driven up relative to the carrier member 115. The actuator 157 is guided for vertical movement relative to the carrier member 115 on the flat outside face of the carrier member by means of guide rollers 173 on pins 141 and 143 received in elongate vertical slots 175 in the actuator 157. Links 133, 135, 147 and 149 are on the outside of the actuator 157, with links 147 and 149 on the outside of links 133 and 135. Links 177 pivoted at 179 on the foot 159 of the actuator 157 are pin-connected as indicated at 181 their upper ends to the stripper rod arms 127, the arrangement being such that on upward movement of the pair of actuators 157 relative to the pair of carriers 115 by the air cylinders 163, the arms 127 are swingable inward on their pivots 129 to move the stripper rods 75 toward one another to their closed position, and on downward movement of the actuators 157 relative to the carriers 115 by the air cylinders 163, the arms 127 are swingable away from one another on their pivots 129 to move the stripper rods 75 away from one another to their open position.

Figure 12:
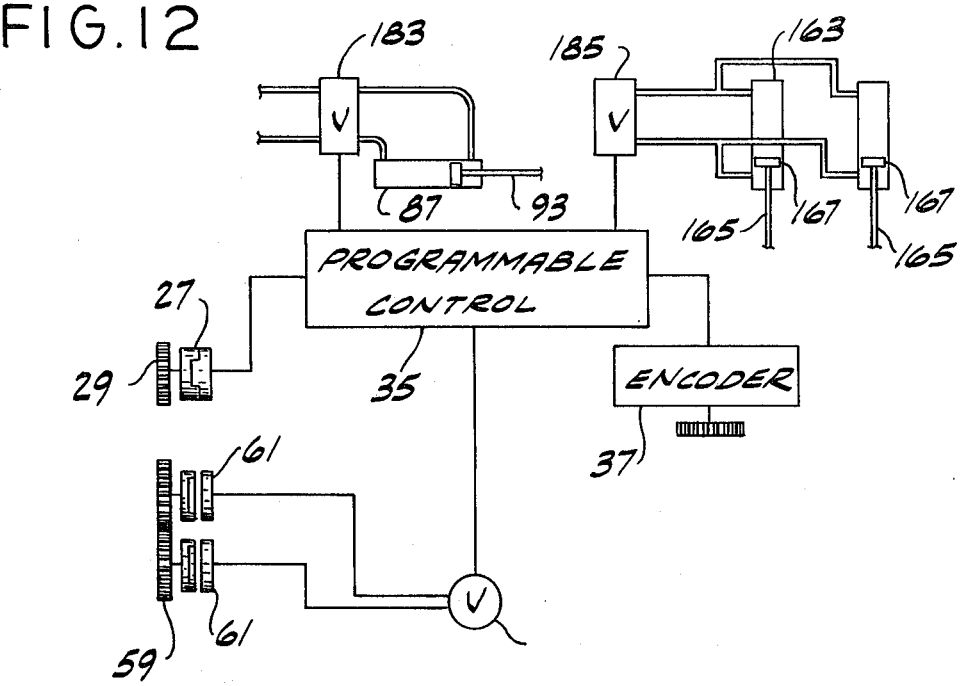
FIG. 12 is a diagram of a control circuit.

The air cylinder 87 for actuating the sealing jaws 17 is under control of a suitable air valve 183 which is in turn under control of the programmable control 35 as illustrated in FIG. 12. When the scale 67 has weighed out the quantity of product to be delivered for a package and has dumped the product for delivery down through the mandrel 13 into the tubing T, control 35 transmits a signal to actuate the valve for actuating the cylinder 87 to retract its piston rod 93 to close the sealing jaws 17, the valve then being deactuated to effect extension of the piston rod to bring the jaws back to their open position. The air cylinders 163 for moving the stripper rods 75 in and out are under control of a suitable air valve 185 which, as illustrated in FIG. 12, is in turn under control of the programmable control 35, the latter functioning to actuate the valve 185 for actuating the cylinders 163 to extend their piston rods 165 thereby to move the stripper rods 75 from their open to their closed position with appropriate timing relative to the closing of the sealing jaws 17, the valve 185 then being deactuated for deactuating the cylinders 163 to retract the piston rods 165 thereby to move the stripper rods 75 from their closed to their open position with appropriate timing relative to the opening of the jaws. Generally, the timing is such that valve 185 is actuated to close the stripper rods 75 just before the sealing jaws move toward each other, and deactuated to open the stripper rods as the sealing jaws apart.

A cycle of operation of the apparatus may be regarded as starting with the sealing jaws 17 open, the stripper rods 75 in their raised position (above the horizontal plane of the jaws) and open, with a package length L of the tubing T extending down from said plane with the lower end of the tubing having an S1 seal, as depicted in FIG. 1. Upon delivery of the product fill F through the mandrel 13 into the tubing, valve 185 is actuated to move the stripper rods 75 from their open position of FIGS. 1 and 14 to their closed position of FIGS. 2 and 15 thereby to form the contraction C in the tubing above the level of the jaws 17, i.e., above the level of the next seal to be made and in most instances above the level of the product fill F. Valve 183 is actuated to move the sealing jaws 17 toward one another. As the jaws 17 move toward one another, the parallelogram linkages 117 and 119 automatically swing down from their FIG. 15 to their FIG. 16 position, thereby pulling down the carrier members 115 (which remain vertical on account of linkages 117 and 119 being parallelogram linkages) to pull down the stripper rods 75 (which are closed). The rods 75 pass down between the jaws 17 before the jaws close completely on the tubing. This transmits the contraction C down the tubing T, squeezing down in the tubing any of the product which may have been in the tubing above the level of the jaws into the interior of the tubing below said level, thereby to compact the product down to the volume corresponding to the size of the bag or pouch to be formed (i.e., corresponding to the package length L) and to clear out product from the region where the seal is to be made by the jaws.

As the stripper rods 75 reach their lower position, jaws 17 complete their inward movement and close on the tubing to form the seal S (see FIGS. 4 and 16), with accompanying severance of the tubing by the kinfe 71 through the seal to divide it into the seals S1 and S2. Then the valve 183 is deactuated to effect extension of the piston rod 93 of the cylinder 87 to move the jaws 17 back to their spaced apart position of FIGS. 1 and 14, and valve 185 is deactuated to effect retraction of piston rods 165 of cylinders 163 to open the stripper rods 75. The timing is such as to enable the stripper rod arms 127 and stripper rods 75 to pass up between the jaws.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The method of forming, filling and sealing packages comprising forming a flexible packaging material into tubing, the tubing extending downwardly, feeding the tubing downwardly and transversely sealing it at package length intervals, and delivering a quantity of the product with which the packages are to be filled into the tubing during an interval of time between successive sealing operations, the transverse seals being formed by a pair of sealing members movable relative to one another between an open position and a closed position in sealing engagement with the tubing, and, with the sealing members open and after the delivery of the product into the tubing and before the next seal is made, squeezing the tubing above the sealing members by positively moving a pair of stripper members relative to one another independently of the movement of the sealing members from an open position to a closed position wherein the stripper members are closely adjacent one another on opposite sides of the tubing in engagement with the tubing above the sealing members, then holding the stripper members in their closed position while moving them generally straight down on the tubing between the sealing members from above to below the sealing members, thereby to compact the product in the tubing below the level of the next seal to be made, closing the sealing members on the tubing above the stripper members, and then opening the stripper members and the sealing members and moving the stripper members up between the sealing members returning them to their open position.

2. The method of claim 1 wherein the downward movement of the stripper members is effected by the closing movement of the sealing members and the upward movement of the stripper members is effected by the opening movement of the sealing members.

3. The method of claim 2 wherein the sealing members are operable in a generally horizontal fixed plane, the tubing being intermittently fed downwardly between the sealing members one package length increment when the sealing members are open, the stripper members then moving to their closed position above the sealing members, the sealing members then closing on the tubing and, in closing, moving the stripper members generally straight down on the tubing between the sealing members to a position below the sealing members before the sealing members are fully closed.

4. Apparatus for forming, filling and sealing packages comprising means for forming flexible packaging material into tubing, the tubing extending downwardly, means for feeding the tubing downwardly and transversely sealing it at package length intervals comprising a pair of sealing members movable relatively to one another between an open position and a closed position in sealing engagement with the tubing and means for moving the sealing members between their said positions, a pair of stripper members mounted for movement relative to one another from an open position to a closed position wherein the stripper members are closely adjacent one another on opposite sides of the tubing in engagement with and squeezing the tubing above the sealing members, means for positively moving the stripper members between their said open and closed positions independently of the movement of the sealing members, and means for mounting said stripper members for movement, while held in their closed position and when the sealing members are open, generally straight down on the tubing between the sealing members from above to below the sealing members, thereby to compact the product in the tubing below the level of the next seal to be made, and back up between the sealing members when the sealing members are open.

5. Apparatus as set forth in claim 4 having means actuated by the sealing members for moving the stripper members down as the sealing members close and for moving the stripper members up as the sealing members open.

6. Apparatus as set forth in claim 5 having a pair of stripper member carriers carried by the sealing members at opposite sides of the apparatus below the sealing members, means extending up from the carriers carrying the stripper members and movable relative to the carriers for moving the stripper members between their open and closed positions, said means for positively moving the carriers between their open and closed positions comprising air cylinder means associated with the carriers, said carriers being movable relative to the sealing members between a raised position and a lowered position for raising and lowering the stripper members, said means actuated by the sealing members comprising means for moving the carriers down from their raised position to their lowered position as the sealing members close and back up from their lowered to their raised position as the sealing members open.

7. Apparatus for forming, filling and sealing packages comprising:
 (a) means for forming flexible packaging material into tubing, the tubing extending downwardly;
 (b) means for feeding the tubing downwardly;
 (c) means for transversely sealing the tubing at package length intervals, a quantity of the product with which the packages are to be filled being delivered into the tubing during an interval of time between successive sealing operations;
 (d) said transverse sealing means comprising a pair of sealing members and means for moving said sealing members relatively to one another between an open position clear of the tubing and a closed position in sealing engagement with the tubing;
 (e) said sealing members being operable in a generally horizontal fixed plane, the tubing being intermittently fed downwardly between the sealing members one package length increment when the sealing members are open, the sealing members then closing on the tubing;
 (f) means operable after the delivery of the product into the tubing and before the next seal is made to form a contraction in the tubing above the level of the next seal to be made and transmitting the contraction down on the tubing from above to below said level, the next seal then being made; characterized in that:
  (1) said contraction forming means comprises a pair of stripper members movable relative to one another from an open position to a closed position in engagement with and squeezing the tubing, and movable up and down relative to the tubing;
  (2) the stripper members are closed on the tubing above the sealing members after the delivery of the product into the tubing and before the next seal is made, the closed stripper members being moved down on the tubing between the sealing members from above to below the sealing members as the sealing members close to form the next seal and before the next seal is made;

(3) the stripper members are carried by means supported by the sealing members, said stripper member carrying means being operable to move the stripper members down from their raised to their lowered position with the stripper members in their closed position and to move the stripper members up to their raised position, the stripper members being opened for the next cycle of operation, (4) said stripper member carrying means comprises a pair of carriers, one at each side of the apparatus, a first pair of parallelogram linkage means interconnecting one of the sealing members and the carriers, a second pair of parallelogram linkage means interconnecting the other of the sealing members and the carriers, the stripper members comprising rods extending transversely of the apparatus and means for moving said stripper rods on the carriers toward and away from one another.

8. Apparatus as set forth in claim 7 wherein the means for moving the stripper rods toward and away from each other comprises air cylinder means carried by the carriers.

9. Apparatus as set forth in claim 7 wherein the means mounting the stripper rods on the carriers comprises a pair of arms for each stripper rod, the arms of each pair being pivoted at lower ends thereof on the carriers and extending up from the carriers, with each stripper rod extending between the arms of the respective pair of arms at the upper ends of the arms, and having means associated with the carriers for swinging the pairs of arms toward and away from each other.

10. Apparatus for forming, filling and sealing package comprising:

means for forming flexible packaging material into tubing;

a pair of sealing members extending transversely of the tubing for forming transverse seals across the tubing at package length intervals, the tubing extending down between the sealing members;

means for moving the sealing members relatively to one another between an open position spaced from one another enabling relative movement of the tubing and sealing members to provide a package length of tubing extending down from the level of the sealing members, and a closed position in sealing engagement with the tubing;

a quantity of the product with which the packages are to be filled being delivered into the tubing during the interval between successive closing operations of the sealing members;

said apparatus being characterized in having:

a pair of stripper members extending transversely of the tubing generally parallel to the sealing members, the tubing extending down between the stripper members;

the stripper members being movable relatively to one another, and relatively to the sealing members and the tubing, between an open position enabling the stated relative movement of the tubing and sealing members to provide the said package length of tubing extending down from the level of the sealing members, and a closed position in engagement with and squeezing the tubing;

the stripper members also being movable up and down relative to the sealing members, being movable from a lowered position below the level of the sealing members upwardly between the sealing members to a raised position above the level of the sealing members, and movable downwardly between the sealing members to the lowered position; and means operable after the delivery of the product to close the stripper members when in their raised position to squeeze the tubing, then operable as the sealing members close to move the stripper members down from their raised to their lowered position with the stripper members remaining closed to squeeze any product which may have been in the tubing above the level of the lowered position of the stripper members down to the latter level and below the level of the sealing members, and subsequently operable as the sealing members open to move the stripper members to their raised position for the next cycle;

wherein the stripper members are carried by means supported by the sealing members, said stripper member carrying means being operable to move the stripper members down from their raised to their lowered position with the stripper members in their closed position and to move the stripper members up to their raised position, the stripper members being opened for the next cycle of operation;

said stripper member carrying means comprising a pair of carriers, one at each side of the apparatus, a first pair of parallelogram linkage means interconnecting one of the sealing members and the carriers, a second pair of parallelogram linkage means interconnecting the other of the sealing members and the carriers, the stripper members comprising rods extending transversely of the apparatus and means mounting said stripper rods on the carriers for movement toward and away from one another.

11. Apparatus as set forth in claim 10 having means associated with the carriers for moving the stripper rods toward and away from each other.

12. Apparatus as set forth in claim 11 wherein the means for moving the stripper rods toward and away from each other comprises air cylinder means carried by the carriers.

13. Apparatus as set forth in claim 11 wherein the means mounting the stripper rods on the carriers comprises a pair of arms for each stripper rod, the arms of each pair being pivoted at lower ends thereof on the carriers and extending up from the carriers, with each stripper rod extending between the arms of the respective pair of arms at the upper ends of the arms, and having means associated with the carriers for swinging the pairs of arms toward and away from each other.

14. Apparatus as set forth in claim 13 wherein the means for swinging the pairs of arms toward and away from each other comprises air cylinder means carried by the carriers.

* * * * *